US005400226A

United States Patent [19]

Hogrefe

[11] Patent Number: 5,400,226

[45] Date of Patent: Mar. 21, 1995

[54] HEADLAMP FOR MOTOR VEHICLE

[75] Inventor: Henning Hogrefe, Reutlingen, Germany

[73] Assignee: Robert Bosch GmbH, Stuttgart, Germany

[21] Appl. No.: 930,388

[22] PCT Filed: Dec. 21, 1991

[86] PCT No.: PCT/DE91/01004

§ 371 Date: Sep. 9, 1992

§ 102(e) Date: Sep. 9, 1992

[87] PCT Pub. No.: WO92/12379

PCT Pub. Date: Jul. 23, 1992

[30] Foreign Application Priority Data

Jan. 9, 1991 [DE] Germany .......................... 41 00 411.6

[51] Int. Cl.⁶ .................................................. B60Q 1/04

[52] U.S. Cl. ........................................ 362/61; 362/297; 362/346

[58] Field of Search .................. 362/61, 297, 304, 346, 362/347, 310, 296

[56] References Cited

U.S. PATENT DOCUMENTS

| | | | |
|---|---|---|---|
| 1,394,896 | 10/1921 | Halvorson, Jr. | 362/61 |
| 1,575,327 | 3/1926 | Garford et al. | 362/61 |
| 1,610,124 | 12/1926 | Godley | 362/304 |
| 4,447,865 | 5/1984 | Vanhorn et al. | 362/346 |
| 4,494,176 | 1/1985 | Sands et al. | 362/346 |
| 4,654,758 | 3/1987 | Szekacs | 362/297 |
| 4,825,344 | 4/1989 | Ichihara et al. | 362/346 |
| 5,171,082 | 12/1992 | Watanabe | 362/61 |
| 5,215,368 | 6/1993 | Neumann | 362/346 |

FOREIGN PATENT DOCUMENTS

| | | | |
|---|---|---|---|
| 6672 | of 1928 | Australia | 362/304 |
| 973391 | 2/1951 | France | 362/346 |
| 2528537 | 6/1982 | France . | |
| 753691 | 1/1953 | Germany . | |
| 3609659 | 10/1986 | Germany . | |
| 287712 | 2/1965 | Netherlands | 362/297 |
| 178388 | 4/1921 | United Kingdom . | |
| 440293 | 11/1934 | United Kingdom . | |
| 1183481 | 3/1970 | United Kingdom | 362/347 |
| 2138930 | 10/1984 | United Kingdom . | |

*Primary Examiner*—Ira S. Lazarus
*Assistant Examiner*—Y. Quach
*Attorney, Agent, or Firm*—Michael J. Striker

[57] ABSTRACT

A headlamp for motor vehicles, particularly high-beam headlamps has a reflector having a light outlet opening and also having a central region and a peripheral region with different reflecting surfaces, a discontinuity formed at the transition between the central and peripheral region, a light disc covering the light outlet opening of the reflector, and a luminous element arranged on a center axis of the reflector, so that images of the luminous element are reflected so as to be horizontally scattered by one of the regions and images of the luminous element are reflected in a center of a light distribution produced by the reflector by another of the regions.

8 Claims, 2 Drawing Sheets

HEADLAMP FOR MOTOR VEHICLE

BACKGROUND OF THE INVENTION

The present invention relates to a headlamp for motor vehicles.

More particularly, it relates to a headlamp for motor vehicles, particular high beam headlights, which has a reflector with a central and peripheral region having different reflecting surfaces, a discontinuity at the transition between the regions, a light disc which covers a light outlet opening of the reflector, and a luminous element arranged on the center axis of the reflector.

Such a headlamp is known from DE-PS 753 691. This headlamp has a reflector with a central region and a peripheral region with differently shaped reflecting surfaces. A luminous element is arranged on the optical axis of the reflector. A bend is formed at the transition between the central region and the peripheral region.

A high-beam headlamp for motor vehicles is known from DE-OS 36 09 659. This headlamp has a reflector in the form of a paraboloid of revolution, a luminous element being arranged on its optical axis. The reflector produces a parallel luminous beam with a pronounced maximum in the center of the light distribution, but with less scattering. For the purpose of forming the light distribution desired for the high beam with a high light intensity in the center of the light distribution and a horizontal scattering, a scattering disk is provided which has optical elements which deflect the light beams reflected by the reflector in the required direction at the required intensity. However, a disadvantage of the scattering disk consists in that it cannot be arranged at a sharp inclination as is desired in motor vehicles for achieving low air resistance, since the light beams will otherwise also be deflected vertically by the optical elements in an undesirable manner. Moreover, the scattering disk with the optical elements is costly to produce.

SUMMARY OF THE INVENTION

Accordingly, it is an object of the present invention to provide a headlamp for motor vehicles, which avoids the disadvantages of the prior art.

In keeping with these objects and with others which will become apparent hereinafter, one feature of the present invention resides, briefly stated, in a headlamp of the above mentioned type, in which images of the luminous element are reflected so as to be horizontally scattered by one of the regions, and images of the luminous element are reflected in the center of the light distribution produced by the reflector by the other region.

When the headlamp for motor vehicles is designed in accordance with the present invention, it has the advantage that the desired light distribution is already produced by the reflector with a horizontally scattered luminous beam and a high maximum light intensity in the center of the light distribution so that the light disk need have no optical elements.

In accordance with another feature of the present invention, the central region reflects the image of the luminous element in a scattered manner, and the peripheral region reflects the images of the luminous element in the center of the light distribution.

The reflecting surface of the central region can contain a parabola in section vertically through the center as a section curve, a hyperbola or a curve similar to a hyperbola in the horizontal longitudinal section as section curve, or also an ellipse or a curve similar to an ellipse in the horizontal longitudinal section as section curve. The central region can be divided into two halves meeting in the vertical center plane of the reflector, and the optical axes of the two halves can extend in the horizontal center plane so as to diverge from one another.

Finally, the reflecting surface of the peripheral region can contain parabolas or curves similar to parabolas as section curves in an axial longitudinal section.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
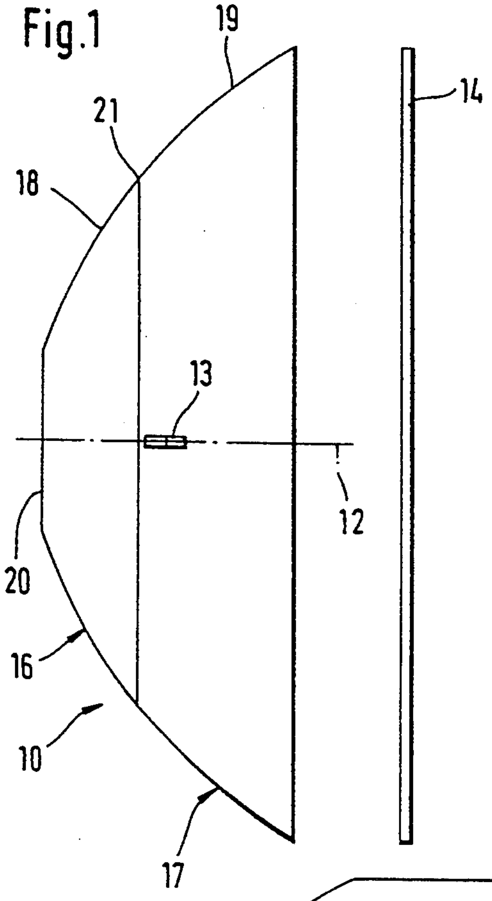
FIG. 1 shows a first embodiment example of the headlamp in section horizontally through the center.
Figure 2:
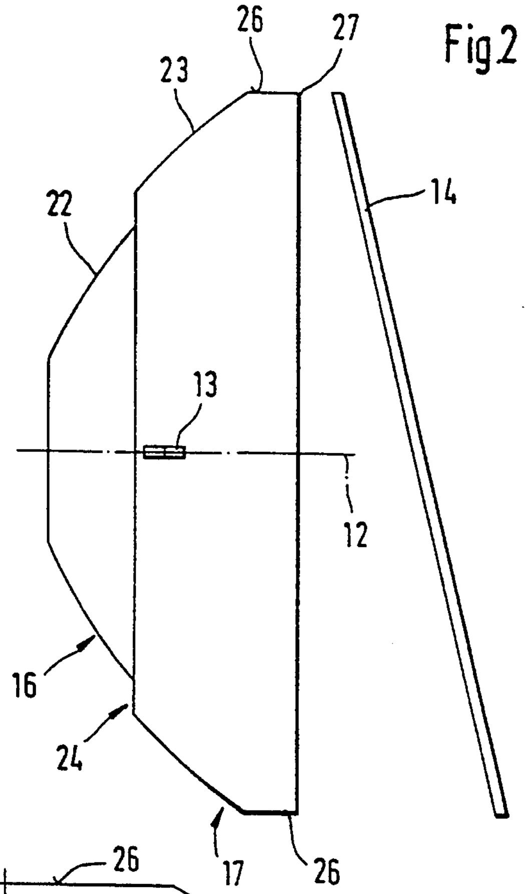
FIG. 2 shows the headlamp of FIG. 1 in section vertically through the center.
Figure 3:
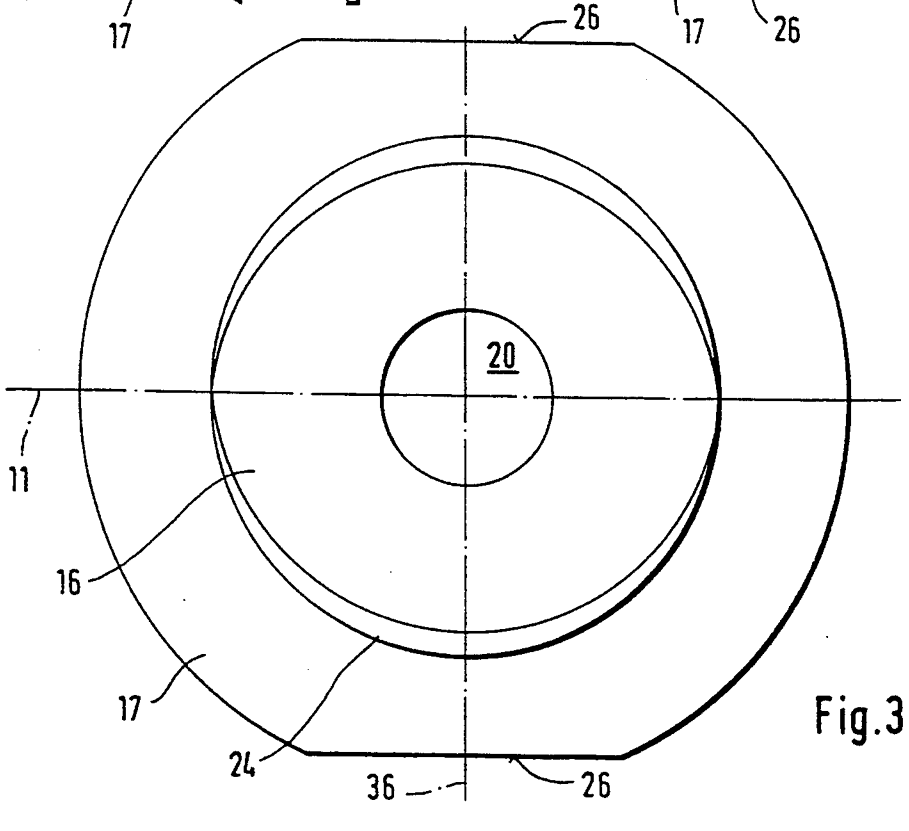
FIG. 3 shows a front view of the reflector of the headlamp of FIG. 1.

A high-beam headlamp for motor vehicles shown in FIGS. 1 to 3 has a reflector 10 of plastic with a center axis 12 which lies in the horizontal center plane 11 and is simultaneously the optical axis of the reflector 10. A spiral-wound filament 13 of an incandescent lamp, not shown, is arranged on the center axis 12 as luminous element. The spiral-wound filament 13 is an axial spiral extending along the optical axis 12. However, the arc of a gas-discharge lamp can also serve as luminous element. The light outlet opening of the reflector 10 is covered by a light disk 14 which is arranged at an inclination with reference to the vertical line. Moreover, the light disk 14 can also be arranged so as to be swiveled horizontally.

The reflector 10 is divided into a central region 16 and a peripheral region 17 which completely and uninterruptedly surrounds the central region. The central region 16 has an opening 20 for inserting the light source. The peripheral region 17 adjoins the central region 16 in the light outlet direction and in the radial direction. The reflecting surface of the central region 16 contains a hyperbola 18 as section curve in section horizontally through the center as shown in FIG. 1. The reflecting surface of the peripheral region 17 contains a parabola 19 as section curve in section horizontally through the center. A bend 21 is formed at the transition between the hyperbola 18 and the parabola 19. The first focal point of the hyperbola 18 and the focal point of the parabola 19 lie at the same location approximately in the center of the spiral-wound filament 13. As shown in FIG. 2, the reflecting surface of the central region contains a parabola 22 as section curve in section vertically through the center. The parabola 22 is not identical to the parabola 19. The reflecting surface of the peripheral region 17 contains a parabola 23 as section curve in section vertically through the center. The parabola 23 is identical to the parabola 19 in section horizontally through the center, so that the reflecting surface of the peripheral region is formed by a paraboloid of revolution. A radial step 24 is formed as a discontinuity at the transition between the parabola 22 of the center region 16 and the parabola 23 of the peripheral region 17. The focal points of the parabolas 22 and 23 lie at the same location as the focal points of the section curves in section horizontally through the center, approximately in the center of the spiral-wound filament 13. The parabolas 22 and 23 have different focal lengths. In the transition from the vertical section through the center to the horizontal section through the center, the section curves resulting in the axial longitudinal sections through the central region 16 pass continuously from the parabola 22 into the hyperbola 18. The step 24 in the vertical section through the center becomes increasingly more pronounced, while there is only the bend 21 or a small step in section horizontally through the center.

The peripheral region 17 of the reflector can be defined at its upper and lower edge region by horizontal planar surfaces 26 so that the parabola 23 in the vertical section through the center does not extend until the front edge 27 of the reflector.

Figure 4:
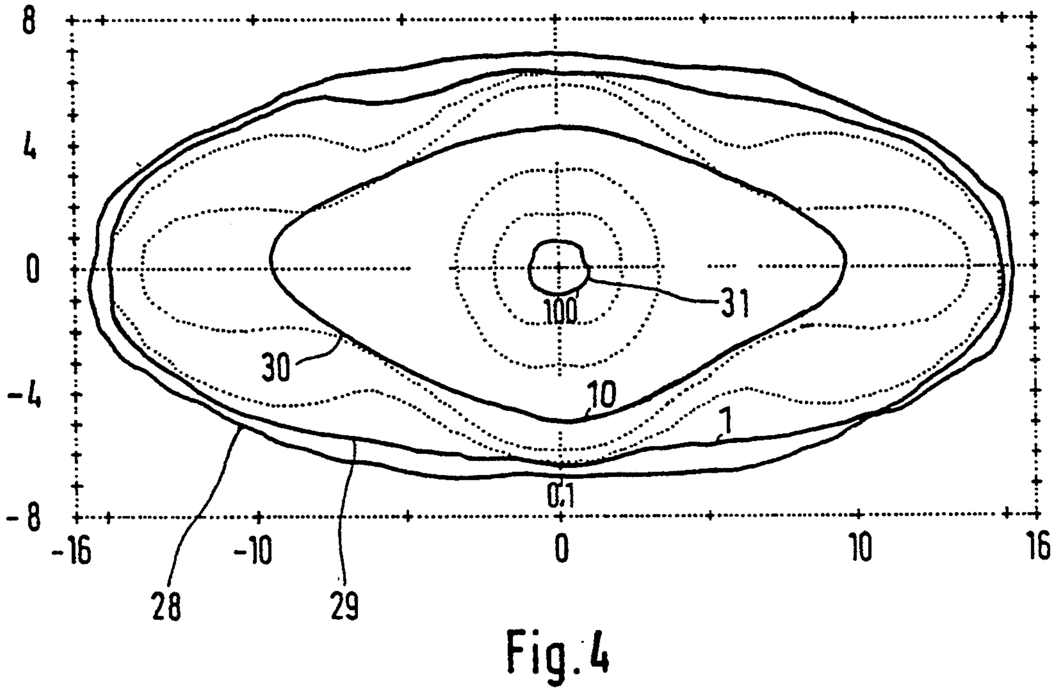
FIG. 4 shows the light distribution produced by the reflector.

FIG. 4 shows the light distribution provided by the reflector 10 on a measurement screen arranged vertically relative to the optical axis 12 with reference to a plurality of isolux lines 28 to 31 which have the same light intensity values of 0.1, 1, 10 and 100 lux. The light distribution has a large horizontal width and a pronounced maximum in the center with high light intensity values. The width of the light distribution is achieved by large images of the spiral-wound filament 13 reflected by the central region 16 of the reflector 10. A horizontally scattered luminous beam is generated by the construction of the central region 16 with the hyperbola in section horizontally through the center. The luminous beam determines the width of the light distribution and provides only a small proportion relative to the maximum light intensity in the center of the light distribution. Small images of the spiral-wound filament 13 are reflected in the center of the light distribution by the peripheral region 17 of the reflector 10 so that the aforementioned high light intensity values occur.

In a variant, not shown, the parabola 23 in the vertical section through the center of the peripheral region can also differ from the parabola 19 in section horizontally through the center. The reflecting surface of the peripheral region 17 is then formed by a general paraboloid. Moreover, the reflecting surface of the peripheral region 17 can be constructed in such a way that the section curves in the horizontal and vertical sections through the center are not pure parabolas, but rather their equations differ from the equation of a parabola, e.g. by correction factors. For the rest, the reflecting surface of the central region 16 in section horizontally through the center can also contain an ellipse as section curve instead of the hyperbola 18 so that a horizontally scattered luminous beam is likewise generated by the central region. Moreover, in contrast to the preceding embodiment example, the central region of the reflector is constructed in such a way that it reflects light in the center of the light distribution and the peripheral region can be constructed in such a way that it reflects light in a horizontally scattered luminous beam.

Figure 5:
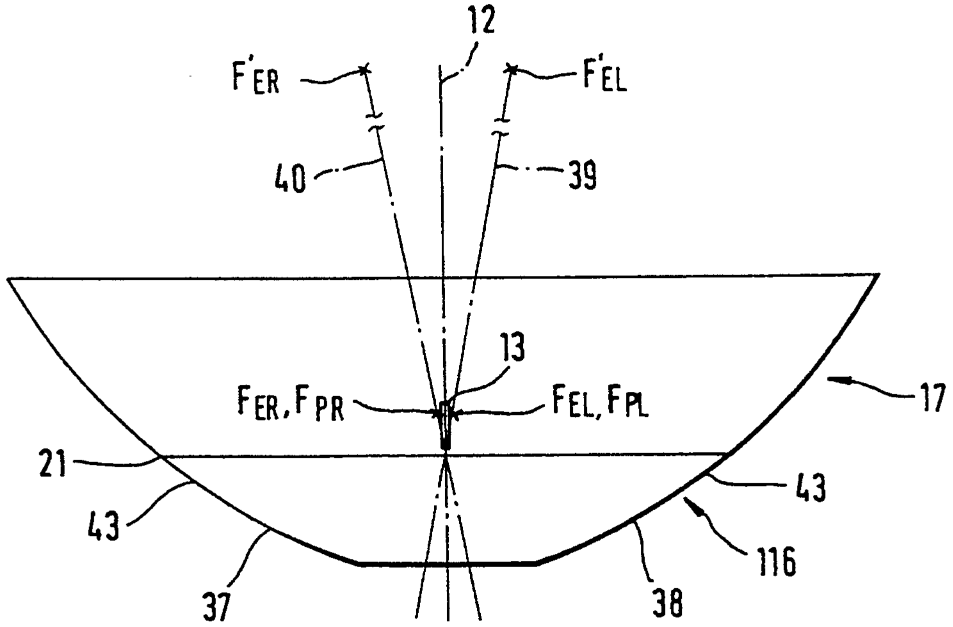
FIG. 5 is a second embodiment example of a headlamp in section horizontally through the center.

In a second embodiment example of the headlamp shown in section horizontally through the center in FIG. 5 the peripheral region of the reflector is constructed as described in the first embodiment example. The central region 16 is divided into two halves 37 and 38 meeting in the vertical center plane 36 in contrast to the first embodiment example. The optical axes 39 and 40 of the two halves extend in the horizontal center plane 11 so as to be swiveled relative to one another. The optical axes 39, 40 can also be arranged so as to be dislocated parallel to one another. The halves 37, 38 have reflecting surfaces which contain a parabola in vertical axial sections through the respective optical axis 39, 40. The reflecting surfaces of the halves 37, 38 contain an ellipse 43 in the respective horizontal axial section. The focal points $F_{PL}$, $F_{PR}$ of the parabolas and the first focal points $F_{EL}$, $F_{ER}$ of the ellipses 43 coincide for each half and lie on the respective optical axis 39, 40 on a vertical line relative to the center axis 12 through the center of the spiral-wound filament 13. The second focal points $F'_{EL}$, $F'_{ER}$ of the ellipses 43 lie in the light outlet direction on the respective optical axis 39, 40. In the transition from the horizontal axial section to the vertical axial section the second focal points $F'_{EL}$, $F'_{ER}$ of the ellipses 43 "wander" relative to the position of the second focal points of the parabolas in the infinite line. A bend 21 or a small step is formed in section horizontally through the center between the central region 116 and the peripheral region 17. A step is formed in section vertically through the center as in the reflector shown in FIG. 2. In this construction of the central region 116, a horizontally scattered luminous beam is also produced by this central region 116.

It will be understood that each of the elements described above, or two or more together, may also find a useful application in other types of constructions differing from the types described above.

While the invention has been illustrated and described as embodied in a headlamp for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A high-beam headlamp for motor vehicles, generating a light distribution to illuminate a roadway in front of said motor vehicle, said headlamp comprising a reflector having a light outlet opening and also having a central region with a reflecting surface and a peripheral region with a reflecting surface, said reflecting surface of said peripheral region being different from said reflecting region of said central region; a discontinuity formed as a transition between said central region and said peripheral region; a light disc covering said light outlet opening of said reflector; and a luminous element arranged on a center axis of said reflector, said reflecting surface of said peripheral region being formed to reflect images of said luminous element into a center of said light distribution and of said roadway to provide in said center high light intensity values, said reflecting surface of said central region containing a parabola in a vertical longitudinal section as a section curve and containing a curve for horizontally scattering images of said luminous element in a horizontal longitudinal section so that said central region reflects images of said luminous element as a horizontally scattered luminous beam on the roadway determining a width of the light distribution being generated by said headlamp, said central region of said reflector being completely uninterruptedly surrounded by said peripheral region of said reflector.

2. A headlamp as defined in claim 1, wherein said reflecting surface of said central region contains a hyperbola in said horizontal longitudinal section as a section curve.

3. A headlamp as defined in claim 1, wherein said reflecting surface of said central region contains said curve similar to a hyperbola in said horizontal longitudinal section as a section curve.

4. A headlamp as defined in claim 1, wherein said reflecting surface of said central region contains an ellipse in a horizontal longitudinal section as said section curve.

5. A headlamp as defined in claim 1, wherein said reflecting surface of said central region contains said curve similar to an ellipse in said horizontal longitudinal section as a section curve.

6. A headlamp as defined in claim 1, wherein said central region is divided into two halves meeting in a vertical central plane of said reflector, said halves having optical axes which extend in a horizontal central plane so as to diverge from one another.

7. A headlamp as defined in claim 1, wherein said reflecting surface of said peripheral region contains parabolas as section curves in an axial longitudinal section.

8. A headlamp as defined in claim 1, wherein said reflecting surface of said peripheral region contains curves similar to parabolas as section curves in an axial longitudinal section.

* * * * *